(12) United States Patent
Shojayi et al.

(10) Patent No.: US 8,509,815 B1
(45) Date of Patent: Aug. 13, 2013

(54) DYNAMICALLY UPDATING A HOME AGENT WITH LOCATION-BASED INFORMATION

(75) Inventors: Joseph Christopher Shojayi, Overland Park, KS (US); Frederick C. Rogers, Olathe, KS (US); Jeremy R. Breau, Leawood, KS (US); Terry D. Nebergall, Gardner, KS (US); John H. Bennett, III, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 966 days.

(21) Appl. No.: 12/470,115

(22) Filed: May 21, 2009

(51) Int. Cl.
*H04W 68/00* (2009.01)

(52) U.S. Cl.
USPC .................................................. 455/456.3

(58) Field of Classification Search
USPC ............. 455/456.1–456.6, 452.1, 404.2, 406, 455/405, 426.1, 418, 422.1, 435.1, 436, 432.1, 455/429, 433, 437, 440; 370/270, 331, 327, 370/395.31
See application file for complete search history.

(56) References Cited

U.S. PATENT DOCUMENTS

| | | | |
|---|---|---|---|
| 6,707,809 B1 * | 3/2004 | Warrier et al. | 370/351 |
| 6,766,373 B1 * | 7/2004 | Beadle et al. | 709/227 |
| 7,746,836 B2 * | 6/2010 | Jentz et al. | 370/338 |
| 8,391,226 B2 * | 3/2013 | Rune | 370/329 |
| 2002/0034298 A1 * | 3/2002 | Gallagher et al. | 380/247 |
| 2002/0194331 A1 * | 12/2002 | Lewis et al. | 709/224 |
| 2003/0223426 A1 * | 12/2003 | Requena et al. | 370/395.2 |
| 2004/0109459 A1 * | 6/2004 | Madour et al. | 370/401 |
| 2004/0166898 A1 * | 8/2004 | Tajima | 455/560 |
| 2004/0176091 A1 * | 9/2004 | Bajko et al. | 455/435.1 |
| 2009/0022126 A1 * | 1/2009 | Damle et al. | 370/338 |
| 2009/0290529 A1 * | 11/2009 | Toyokawa et al. | 370/315 |
| 2010/0027509 A1 * | 2/2010 | Velev et al. | 370/331 |

\* cited by examiner

*Primary Examiner* — Melody Mehrpour

(57) ABSTRACT

Methods and computer-readable media are provided to dynamically update a home agent with location-based information for a mobile device such that a third party, such as a law enforcement agency, may access the information to determine a location associated with the mobile device and, therefore, with the user of the mobile device. A signaling message is sent to a packet-routing component. The signaling message contains location-based information for a communications session. A transaction update is sent from the packet-routing component to the home agent each time the location-based information is updated, such as when the mobile device enters a new coverage area. A binding table is populated with the updated information. An acknowledgment is then sent from the home agent to the packet-routing component indicating that the information has been updated in the binding table. The third party is now able to access the location-based information via the home agent.

12 Claims, 6 Drawing Sheets

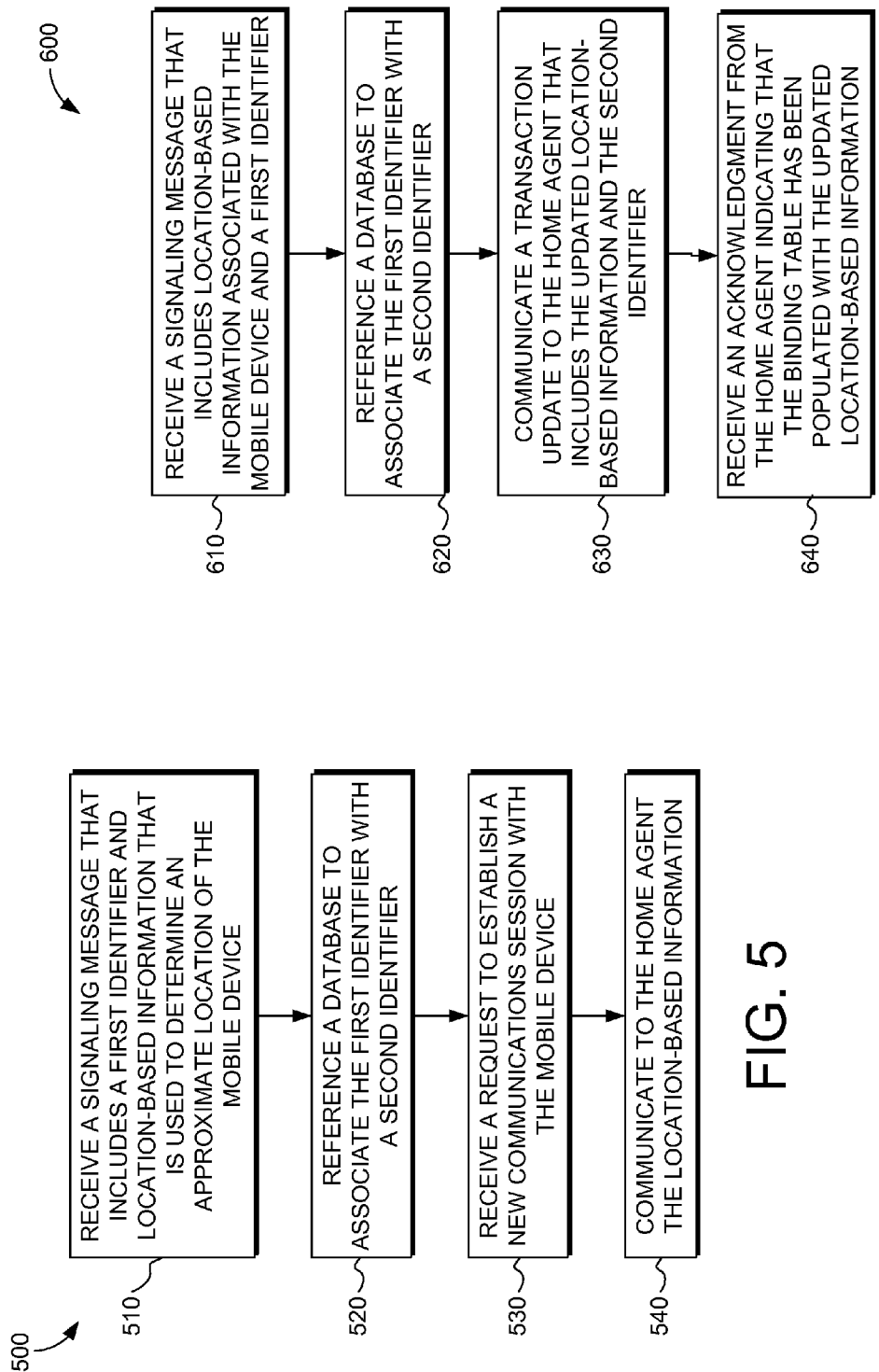

DYNAMICALLY UPDATING A HOME AGENT WITH LOCATION-BASED INFORMATION

SUMMARY

Embodiments of the invention are defined by the claims below, not this summary. A high-level overview of various aspects of the invention are provided here for that reason to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Embodiments of the present invention provide methods and computer-readable media for, among other things, updating a home agent of a wireless telecommunications network with information that allows the home agent to provide billing services, in addition to allowing a third party, such as a law enforcement agency, to determine an approximate location of a mobile device, and therefore of a user of the mobile device. While a packet data serving node (PDSN), for example, may typically have location-based information associated with a mobile device, this information may not be communicated to the home agent, and therefore while the PDSN may be able to perform billing services, the home agent cannot unless it receives the location-based information. For an existing communications session, a binding update may have already been sent to the home agent, which contains information such as a care-of address, a network access identifier, a home address, various timers, a session identifier, etc. None of these, however, allow a third party to determine a location associated with the mobile device. Accordingly, a transaction update may be sent to the home agent each time the mobile device enters a different coverage area, which may be a packet control function, a PDSN, a base transceiver station, a radio access network, or the like. The updated location-based information may be entered into an existing table with the information associated with the binding update, such that the home agent has all of the information necessary for billing and providing third parties with location-based information.

Accordingly, in one aspect, computer-readable media having computer-useable instructions embodied thereon that, when executed, cause a computing device to perform a method of dynamically updating a home agent with location-based information associated with a mobile device, thereby allowing a third party to determine a location of the mobile device, are provided. The method includes receiving a signaling message from the mobile device that includes a first identifier and the location-based information such that an approximate location of the mobile device can be determined by utilizing the location-based information and referencing a database that associates the first identifier with a second identifier. Further, a request is received to establish a new communications session with the mobile device. The request is then forwarded to the home agent. The media additionally include communicating to the home agent the location-based information, thereby providing access of the location-based information to the third party. The communicating includes communicating a transaction update to the home agent that includes the location-based information and the second identifier, and based on the second identifier, the home agent populates a binding table with the location-based information. Further, the communicating includes receiving a first acknowledgement from the home agent indicating that the table has been populated with the location-based information.

In another aspect, computer-readable media having computer-useable instructions embodied thereon that, when executed, cause a computing device to perform a method of dynamically updating a home agent with location-based information associated with a mobile device, thereby allowing a third party to determine a location of the mobile device, are provided. The method includes receiving from the mobile device a signaling message that includes the location-based information and a first identifier indicating that the location-based information has been updated for an existing communications session. The location-based information is updated when the mobile device enters a different coverage area. The media further include referencing a database that associates the first identifier with a second identifier and communicating a transaction update to the home agent that includes the updated location-based information and the second identifier. Based on the second identifier, the home agent updates a binding table with the updated location-based information. Also, the binding table contains one or more attributes associated with the mobile device. Further, the method includes receiving a first acknowledgement from the home agent indicating that the binding table has been populated with the updated location-based information.

In a further aspect, computer-readable media having computer-useable instructions embodied thereon that, when executed, cause a computing device to perform a method of dynamically updating a home agent with location-based information associated with a mobile device, thereby allowing a third party to determine a location of the mobile device, are provided. The method includes receiving from a packet-routing component a transaction update that includes the location-based information and an identifier that identifies a communications session associated with the mobile device. The location-based information is used to determine an approximate location of the mobile device, and includes one or more of a packet control function (PCF), a base transceiver station (BTS), or a session identifier. Further, the method includes associating the identifier with a binding table that contains one or more attributes corresponding to the communications session, and updating the binding table with the location-based information, thereby providing access to the third party of the location-based information that has been updated in the binding table such that the third party can determine the approximate location of the mobile device. Additionally, the method includes communicating an acknowledgment to the packet-routing component that the location-based information has been received.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 is an exemplary flowchart depicting a method of dynamically updating a home agent with location-based information associated with a mobile device for a new communications session, according to an embodiment of the present invention;

FIG. 6 is an exemplary flowchart depicting a method of dynamically updating a home agent with location-based information associated with a mobile device for an existing communications session, according to an embodiment of the present invention.

DETAILED DESCRIPTION

Figure 1:
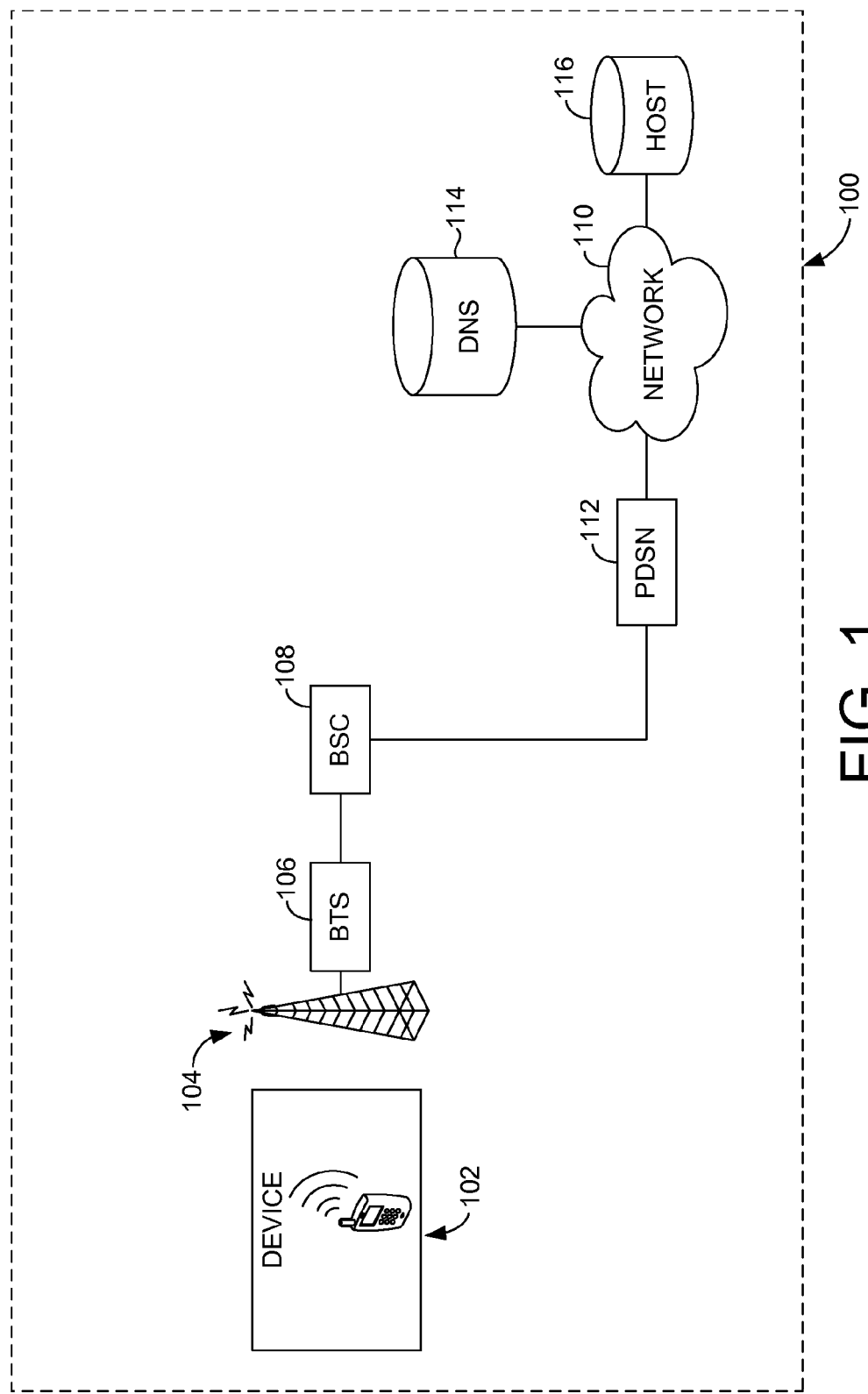
FIG. 1 is a schematic view of an exemplary communications environment suitable for use in implementing embodiments of the present invention.

The subject matter of the present invention is described with specificity herein to meet statutory requirements. Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
4G Fourth-Generation Cellular Communication System
AAA Authentication, Authorization, & Accounting
BSC Base Station Controller
BTS Base Station Transceiver Station
BU Binding Update
CoA Care-of-Address
CD-ROM Compact Disk Read Only Memory
CDMA Code Division Multiple Access
DSL Digital Subscriber Line
DVD Digital Versatile Discs
EEPROM Electrically Erasable Programmable Read Only Memory
FAX Facsimile
GSM Global System for Mobile Communications
HA Home Agent
HoA Home Address
IMSI International Mobile Subscriber Identity
IP Internet Protocol
IPv4 Internet Protocol Version 4
IPv6 Internet Protocol Version 6
LAN Local Area Network
MIPv4 Mobile Internet Protocol Version 4
MIPv6 Mobile Internet Protocol Version 6
NAI Network Access Identifier
PCF Packet Control Function
PDA Personal Digital Assistant
PDSN Packet Data Serving Node
RAM Random Access Memory
RAN Radio Access Network
ROM Read Only Memory
RTU RAN Transaction Update
TV Television
TDMA Time Division Multiple Access
WI-FI Wireless Interface of Mobile Computing Devices
WIMAX Worldwide Interoperability for Microwave Access Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, an exemplary network environment suitable for use in implementing embodiments of the present invention is illustrated and designated generally as reference numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. In the network environment 100, for a device 102 to communicate with a host 116, the device 102 may communicate with a domain name server (DNS) 114 through a network, such as network 110, to obtain an Internet Protocol (IP) address of the host 116. The DNS 114 translates host names, e.g., domain names, into host addresses, e.g., IP addresses.

The device 102 communicates over established radio frequencies through a cell tower 104 having a base transceiver station (BTS) 106, a number of which are typically connected to a base station controller (BSC) 108. The BTS 106 may communicate over a wireless air interface with one or more devices, such as device 102, located in the wireless coverage area. The communication between the BTS 106 and the device 102 may occur in a digital format, such as CDMA, TDMA, GSM, 3G, 4G, or 802.11x, or may occur in an analog format, such as AMPS. The BSC 108 manages the communication between a number of BTSs 106 and a limited number of devices 102 compatible with the network environment 100.

Host 116 refers to any computing device that has two-way access to other computer devices on a network, such as the Internet, LAN, any IP-based network, or other public packet data network. Computing device 102 or the computing device used as host 116 may include any device that performs one or more computing functions including, but not limited to, mobile phones, personal digital assistants (PDAs), televisions, laptops, desktop computers, facsimile machines (FAX), digital versatile disk (DVD) players, servers, e.g., a web server, or any other computing device.

The device 102 may communicate with one or more networks 110, such as the Internet or an IP-based network, via a packet data serving node (PDSN) 112. PDSN 112 is a component of a CDMA2000 mobile network, but any network may be used. In the case of a GSMF or UMTS network, the GPRS Gateway Support Node (GGSN) performs similar functions as PDSN 112. PDSN 112 may act as the connection point between the Radio Access and IP networks, and may be responsible for managing point-to-point protocol (PPP) sessions between the IP network provided by the mobile provider and a mobile device. It may also connect BSC 108 to network 110, and may act as a network access server, providing a device access to network 110. In many instances, PDSN 112 may act as an access gateway providing simple IP and mobile IP access, foreign agent support, and packet transport for virtual private networking. In addition, PDSN 112 may act as a client for Authentication, Authorization, and Accounting (AAA) servers and may provide mobile stations with a gateway to the IP network. Alternatively or additionally, the network environment 100 may include other network elements for providing device access to network 110. The device 102 communicates with the host 116 via the network 110.

Any network environment 100 having a network suitable for communicating between hosting devices, such as device 102 and host 116, may be utilized for implementing the present invention. Such a network environment 100 may, for example, utilize wireless technology or wired technology for network access. Wireless technology may include any wireless technology including, but not limited to 3G, 4G, WI-FI, WIMAX, and the like. Wired technology includes, for example, wireline, DSL, and the like.

Figure 2:
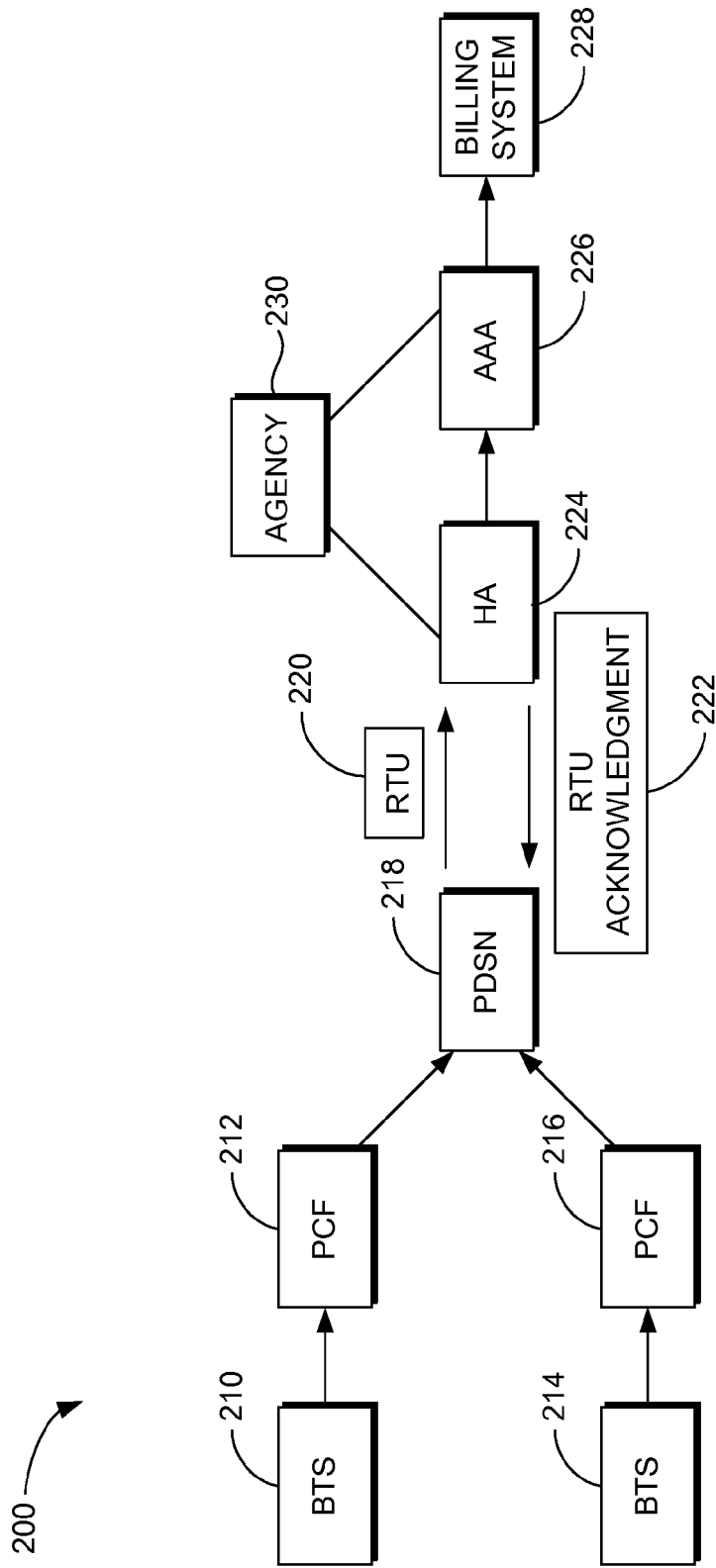
FIG. 2 depicts another schematic view of an exemplary communications environment suitable for use in implementing embodiments of the present invention.

Turning now to FIG. 2, a schematic view of an exemplary communications environment suitable for use in implementing embodiments of the present invention is illustrated and designated generally as reference numeral 200. Initially, one or more base transceiver stations (BTSs), such as BTS 210 and 214, and packet control functions (PCFs), such as PCF 212 and PCF 216, may be associated with a particular packet-routing component, such as PDSN 218. BTSs are generally described above herein, but are the towers that transmit signals to and from the mobile device. Further, the BTS handles the radio interface to the mobile station and is the radio equipment needed to service each mobile device in a particular network. A BTS may include transceivers and antennas of a tower. PCFs control the transmission of packets between the BTS and the PDSN and keep track of registration lifetime expiration and ensure that the sessions are renewed as necessary. While BTSs and PCFs are used herein, it will be appreciated that other components compatible with other mobile networks, such as TDMA, GSM, 3G, 4G, or 802.11x, may also be used and perform the same or a similar function as the components discussed herein.

As described above and shown in FIG. 2, the PDSN 218 interfaces with the PCFs 212 and 216. Additionally, IP packets are routed through the PDSN 218. In embodiments of the present invention, information, such as location-based information associated with a particular mobile device is communicated to the PDSN 218. This information may include, for instance, the base station (BS), the PCF, and other parameters that may be associated with the mobile device's location. This information is typically sent to the PDSN by way of an A11 message. Not only is this information used to determine an approximate location of the mobile device, but it is also used for billing purposes, such as to determine whether the mobile device is within or outside the service provider's coverage area. The approximate location may be, for example, a range, such as a one mile range, a two mile range, a three mile range, etc. These are merely examples of ranges that may be included in the approximate location of the mobile device.

Various embodiments, however, may require that a home agent (HA), such as home agent 224, obtains this location-based information from the PDSN 218, as well as other information that is contained within the PDSN 218. While, typically, the home agent 224 is unaware of the location of the mobile device, the home agent 224 may need this information to perform various services, such as to provide agencies, such as law enforcement agencies, with real-time or near real-time location information of a particular mobile device, or the home agent 224 may even be responsible for billing the user, such as when IPv6 is used to establish a communications session. In order to provide the location-based information to the home agent 224, a transaction update may be sent from the PDSN 218 to the home agent 224. The transaction update, which is illustrated in FIG. 2 as an RTU 220 (RAN transaction update) is communicated to the home agent 224, and may take the form of a signaling message, such as an A11 signaling message, for instance. An A11 signaling message carries information between the PCF and the PDSN for packet data services and provides a signaling connection between a PCF and PDSN pair. A11 signaling messages are also used for passing accounting-related and other information from the PCF to the PDSN. An A10/A11 interface supports mobility between various PCFs under the same PDSN. Once the RTU 220 is received by the home agent 224, the home agent 224 will send an RTU acknowledgment 222 back to the PDSN 218 to verify that the RTU 220 has been received.

In one instance, the signaling message (e.g., A11 message) contains a different identifier than a binding update that is also sent to the home agent 224. A binding update is sent to the home agent 224 either before or after the signaling message is sent, depending on whether there is an existing communications session or whether it is a new communications session. The binding update may contain various attributes such as, for example, a care of address (CoA), a network access identifier (NAI), a home address (HoA), various times that indicate start and stop times, a session identifier, and the like. As different identifiers that identify the user, the mobile device, or the communications session may be used in these various messages, the PDSN may be responsible for linking one identifier to another. This may be done, for example, by accessing a database to locate one identifier and associate it with another identifier. While the signaling message and the RTU 220 may contain much of the same information, the identifier in each of these messages may be different. For example, the signaling message (e.g., A11 message) may contain a session identifier (session ID) or an international mobile subscriber identity (IMSI), but the binding update that may have already been sent to the home agent 224 may contain a different identifier, such as a network access identifier (NAI). Therefore, the PDSN may link the first identifier to a second identifier so that the binding table corresponding to the mobile device can be located.

In one embodiment, the RTU 220 is communicated to the home agent 224 for an existing call or an existing communications session. For an existing call or session, a binding update is sent to the home agent 224 from the PDSN 218 prior to the RTU 220 being sent to the home agent 224. As described above, a binding update may contain various attributes such as, for example, a care of address (CoA), a network access identifier (NAI), a home address (HoA), various times that indicate start and stop times, a session identifier, and the like. Here, a binding table containing one or more attributes associated with the existing session is already in existence when the RTU 220 is received by the home agent 224 such that the home agent 224 may then update the existing binding table. In another embodiment, however, the RTU 220 is communicated to the home agent 224 for a new call or a new communications session. In this embodiment, the RTU 220 is communicated to the home agent 224 prior to a binding update. In this case, when the home agent 224 receives the RTU 220, it holds the information contained in the RTU 220, waits for the binding update to be sent, and then establishes a new binding table containing all of the information.

In both embodiments, once the home agent 224 has the information contained in the RTU 220 and the home agent 224 has included that information into the binding table, records may be sent to the Authentication, Authorization, and Accounting server or database, such as AAA 226, such that billing records may be kept for the mobile device. The AAA 226 may then send a user data record (UDR) to a billing system 228 so that the user of the mobile device can actually receive and pay the bills associated with the mobile device. Prior to billing, the billing system 228 may parse the UDRs that it receives, such as parsing the starts, stops, bytes, bits, etc. As previously mentioned, agencies, such as police departments, the Federal Bureau of Investigation (FBI), etc., may have the need to access information that indicates a user's location. The location of the user's mobile device may be used to determine at least an approximate location of the user. As such, an agency 230 may be linked to both the home agent 224 and the AAA 226. The home agent 224 provides the agency 230 with actual data, while the AAA 226 provides the agency with records.

Figure 3:
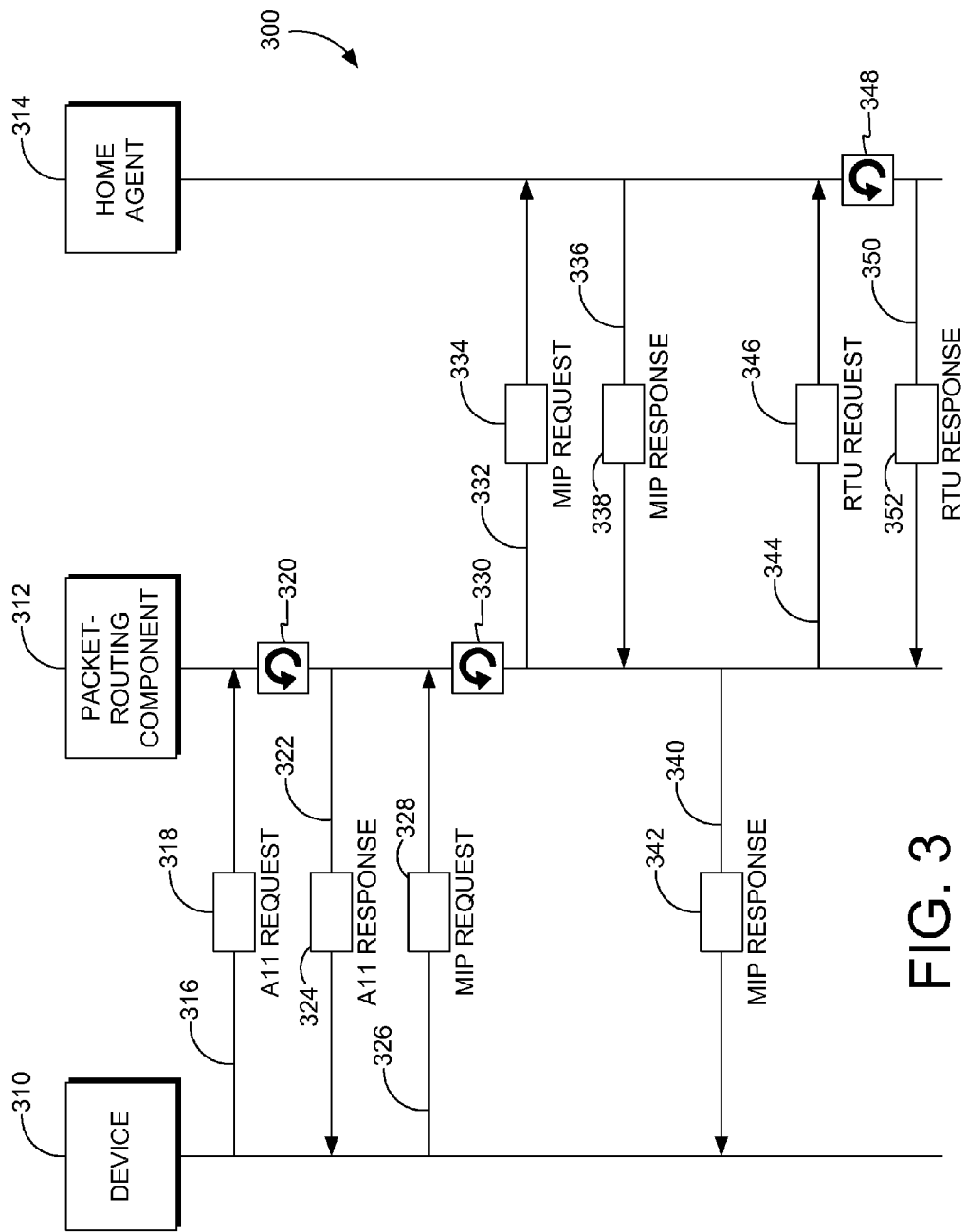
FIG. 3 depicts an illustrative flow diagram of a method of dynamically updating a home agent with location-based information for a new communications session, according to an embodiment of the present invention.

FIG. 3 depicts an illustrative flow diagram of a method 300 of dynamically updating a home agent with location-based information for a new communications session, according to an embodiment of the present invention. Initially, a device 310 communicates with a packet-routing component 312 (e.g., PDSN) via various components, such as a BTS and a PCF, as described in FIG. 2 above. While not illustrated in FIG. 3, it is contemplated to be within the scope of the present invention that various other components, such as a BTS and PCF, as well as many others, may be used to carry out the process described in FIG. 3. In the instance of a new communications session, the device 310 may communicate 316 a signaling message, such as an A11 request 318, to the packet-routing component 312. As stated above, this A11 request may include various attributes, such as, but not limited to, the PCF and the BTS that are currently in the mobile device's coverage area, in addition one or more identifiers, such as a session ID, an NAI, or an IMSI.

At step 320, the packet-routing component 312 creates a binding for the A11 request (e.g., leaves a marker). More specifically, the A11 request is validated, and both the packet-routing component 312 and the PCF create a binding record for the A10 connection. The packet-routing component 312 then communicates 322 an acknowledgment or a response, such as an A11 response 324, back to the device 310 so that the device 310 knows that the A11 request has been received. In order to establish a new communications session using mobile IP, the device 310 communicates 326 a mobile IP (MIP) request 328 to the packet-routing component 312. The MIP request 328 is the binding update that has been described herein. The binding update includes various attributes such as, for instance, a care of address (CoA), a network access identifier (NAI), a home address (HoA), various times that indicate start and stop times associated with the communications session, a session identifier, and the like. At step 330, the packet-routing component 312 links or associates a first identifier contained in the A11 request 318 with a second identifier contained in the MIP request 328. In one embodiment, the two identifiers are the same, and therefore linking is not required.

If the two identifiers are different, however, the packet-routing component 312 links the two identifiers together by, for example, inspecting a database containing various identifiers for a particular user or mobile device to determine the second identifier from the first identifier. Thus, when the MIP request 334 is forwarded or communicated 332 to the home agent 314, it will contain an identifier that the home agent 314 is familiar with. Now, the home agent 314 is able to determine the binding table that corresponds to the mobile device. The home agent 314 may now communicate 336 an MIP response 338 back to the packet-routing component 312 acknowledging that the request was received. This MIP response 342 is then forwarded or communicated 340 back to the device 310.

At this point, the packet-routing component 312 has received the A11 request 318, and has sent the MIP request (e.g., binding update) to the home agent 314. The home agent 314 now needs to have the information contained in the A11 request so that it can populate the binding table with this information such that agencies and the like are able to have real-time or close to real-time location information about the device 310. A RAN transaction update (RTU) request 346 is communicated 344 to the home agent 314 so that the home agent 314 can populate or update the binding table. This is represented by step 348. The home agent 314 then communicates 350 an RTU response 352 back to the packet-routing component acknowledging receipt of the RTU request 346.

Figure 4:
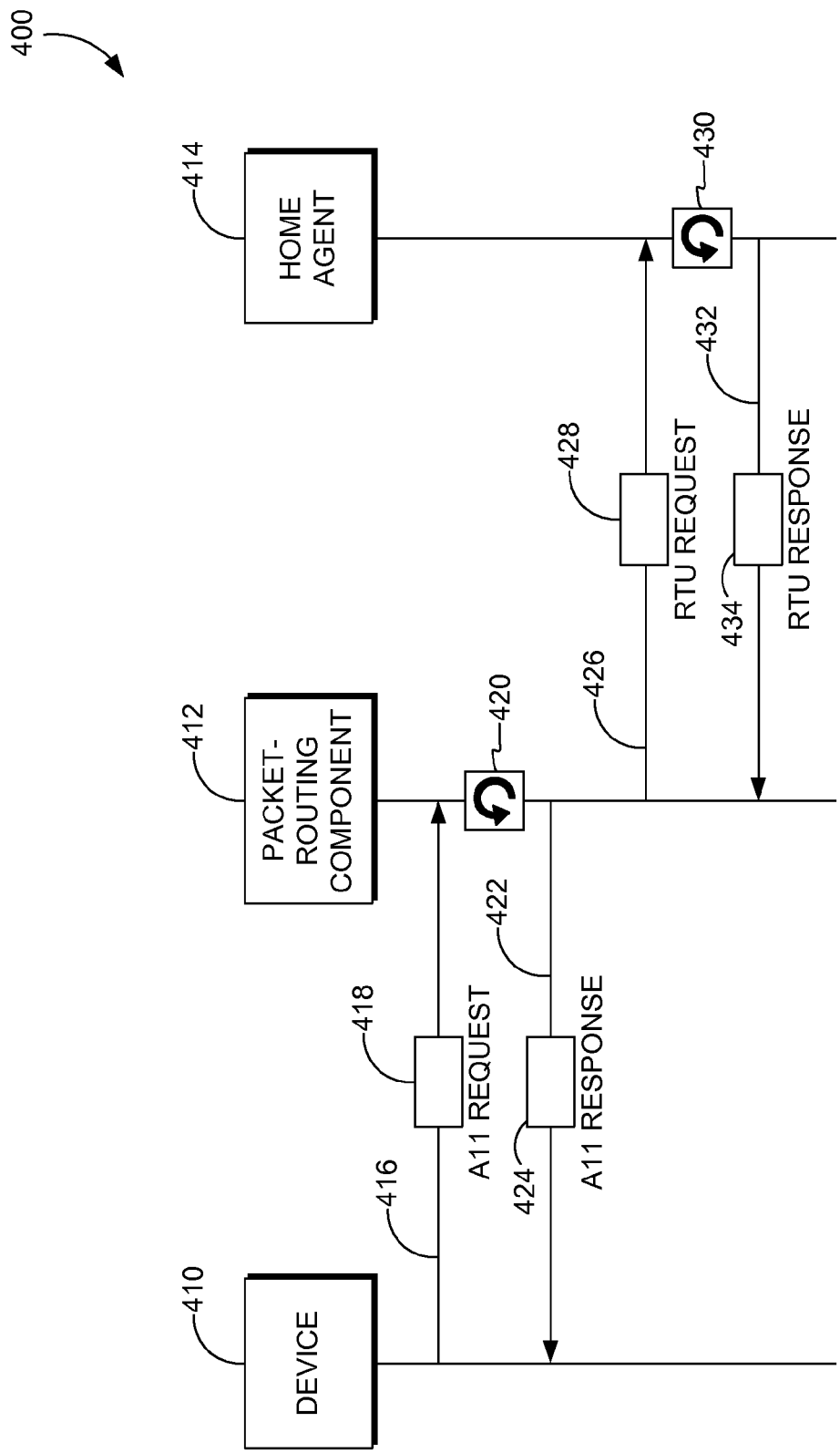
FIG. 4 depicts an illustrative flow diagram of a method of dynamically updating a home agent with location-based information for an existing communications session, according to an embodiment of the present invention.

Turning now to FIG. 4, an illustrative flow diagram is shown of a method 400 of dynamically updating a home agent with location-based information for an existing communications session, according to an embodiment of the present invention. FIG. 4 is similar to FIG. 3 in that it contains many of the same steps described above with respect to FIG. 3. For instance, an A11 request 418 is communicated 416 from a device 410 to a packet-routing component 412 such that the packet-routing component 412 may create a binding, shown at step 420, for the A11 request (e.g., leaves a marker). More specifically, the A11 request is validated, and both the packet-routing component 312 and the PCF create a binding record for the A10 connection. Here, the packet-routing component 412 may also link or associate a first identifier with a second identifier because as in many embodiments, the A11 request 418 may contain a different type of identifier than the MIP request (e.g., binding update), and therefore the two identifiers must be correlated so that the information can be matched up and the updated information can be added to the binding table. The packet-routing component 412 then communicates 422 an acknowledgment in the form of an A11 response 424 back to the device 410.

An RTU request 428 is then communicated 426 to the home agent 414 so that the home agent 414 may update the binding table with the updated information contained in the RTU request 428. It should be noted that the A11 request 418 and the RTU request 428 may contain substantially the same information, with the exception of the type of identifier. Once the table has been populated or updated at step 430, an RTU response 434 is communicated 432 to the packet-routing component 412 indicating an acknowledgment of the RTU request 428.

FIG. 5 is an exemplary flowchart depicting a method 500 of dynamically updating a home agent with location-based information associated with a mobile device for a new communications session, according to an embodiment of the present invention. Initially, at step 510, a signaling message is received by a packet-routing component (e.g., PDSN) from the mobile device. The signaling message, in one embodiment is an A11 request or message that carries information between the PCF and the PDSN for packet data services and provides a signaling connection between a PCF and PDSN pair. The signaling message may include location-based information, such as a PCF, a BTS, or a session identifier and a first identifier, which, in one embodiment, is a session ID or an IMSI. Other types of identifiers are contemplated to be within the scope of the present invention. Using the location-based information, an approximate location of the mobile device can be determined. In one embodiment, the packet-routing component sends an acknowledgment, such as an A11 response, back to the mobile device to indicate that the signaling message (e.g., A11 request) has been received.

At step 520, a database is referenced that associates the first identifier with a second identifier. In one embodiment, the second identifier is an NAI. In other embodiments, however, the second identifier may be any other type of identifier that identifies the communications session, the mobile device, or the user. In a further embodiment, the first and the second identifiers are the same; it may not be required to reference a database to determine the second identifier. One reason that a first and second identifier may be different is that one set of components may refer to a communications session, a user, or a mobile device by one identifier, but a second set of components may refer to these by a different identifier. In one instance, the PCF and PDSN use an IMSI as the identifier, but the home agent uses an NAI. In instances such as these, a database is likely to be referenced so that the home agent has the appropriate identifier when locating the binding table associated with the communications session.

A request is received to establish a new communications sessions with the mobile device at step 530. Once received by the packet-routing component, the request is forwarded to the home agent. This request, in one embodiment, may be in the form of a mobile IP request, such as a binding update. The binding update may contain various attributes or parameters, such as, for example, a care-of-address (COA), an NAI, a home address (HoA), various timers that indicate start and stop times for the communications session, and an identifier, such as a session identifier. In one embodiment, the home agent sends back to the packet-routing component an MIP response that acknowledges receipt of the MIP request, and this response may further be forwarded to the mobile device. As previously mentioned, the request may be for a mobile IP session. In one instance, the request is compliant with IPv4, or is for an IPv4 session, but in another instance, it is compliant with IPv6, or is for an IPv6 session.

At step 540, the location-based information is forwarded to the home agent. In one embodiment, the location-based information is forwarded to the home agent in the form of a RAN transaction update (RTU) request. Once the home agent receives this information, a third party may be able to access the information to determine the location of the mobile device in a timely manner. Location-based information may be updated and sent to the home agent each time the mobile device changes coverage areas, and therefore, the information may be updated in real-time or near real-time. The RTU request may also include the second identifier so that the home agent can locate or create a binding table and populate the table with the location-based information. The home agent may then send an acknowledgment in the form of an RTU response to the packet-routing component indicating that the RTU request with the location-based information was received.

Once the location-based information is received by the home agent, the home agent may forward this information in the form of a record to AAA database or server, such that billing records may be kept for the mobile device. The AAA may then send a user data record (UDR) to a billing system so that the user of the mobile device can actually receive and pay the bills associated with the mobile device. Prior to billing, the billing system may parse the UDRs that it receives, such as parsing the starts, stops, bytes, bits, etc. As previously mentioned, an agency, such as police departments, the Federal Bureau of Investigation (FBI), etc., may have the need to access information that indicates a user's location and may send an agency request to the home agent or AAA to access this information. The location of the user's mobile device may be used to determine at least an approximate location of the user. As such, an agency may be linked to both the home agent and the AAA. The home agent provides the agency with actual data, while the AAA provides the agency with records.

Referring to FIG. 6, an exemplary flowchart is illustrated depicting a method 600 of dynamically updating a home agent with location-based information associated with a mobile device for an existing communications session, according to an embodiment of the present invention. The embodiment of FIG. 6 is different from that of FIG. 5 in that it applies to an existing communications session, such that the transaction update sent to the home agent may contain updated location-based information. At step 610, a signaling message, such as an A11 request, is received by the packet-routing component (e.g., PDSN). The signaling message may include location-based information associated with the mobile device, in addition to a first identifier that identifies one or more of the communications session, the user, or the mobile device. The location-based information may include, but is not limited to, a PCF, a BTS, a session identifier, or the like. This signaling message indicates that the location-based information has been updated for an existing communications session, which may occur when the mobile device enters a different coverage area, such as a PDSN, BSC, PCF, or RAN coverage area. Upon receiving the signaling message, the packet-routing component may communicate to the mobile device an acknowledgment indicating that the signaling message has been received.

At step 620, a database is referenced that associates the first identifier with a second identifier. As described above, various components may identify the communications session, the mobile device, or the user using a different identifier, such as a session identifier, an NAI, or an IMSI. If, for instance, the packet-routing component (e.g., PDSN) and the home agent use different identifiers, the packet-routing component has the capability of accessing a database that associates the different identifiers, thus sending a recognizable identifier to the home agent. For example, the first identifier may be a session identifier or an IMSI, while the second identifier is an NAI. In one embodiment, however, the first identifier and the second identifier may be the same.

A transaction update is communicated to the home agent at step 630. The transaction update (e.g., RTU) may include the updated location-based information and a second identifier. As mentioned, the embodiment of FIG. 6 may apply to an existing communications session, and therefore the home agent may already have been sent location-based information. Once the mobile device moves to a different coverage area, however, updated location-based information may be available. Based on the second identifier, the home agent updates a binding table with the updated location-based information that it has received. The binding table contains one or more attributes or parameters associated with the mobile device, some of which may be communicated to the home agent via the transaction update, and some via an MIP request, such as a binding update, which is illustrated in FIG. 3, and discussed above in relation to FIG. 5. These attributes may include, without limitation, a PCF, a BTS, a session identifier, a CoA, an NAI, an HoA, timers, or the like. An exhaustive list of attributes is not included, but many others not specifically mentioned herein are contemplated to be within the scope of the present invention.

The home agent is able to locate the binding table for the particular communications session using the second identifier which it is sent by the packet-routing component. If the communications session is existing and is not new, a binding table may already be populated for that particular communications session, and therefore each time updated location-based information is sent, the table is updated. At step 640, an acknowledgment is received from the home agent indicating that the binding table has been populated with the updated location-based information.

Figure 7:
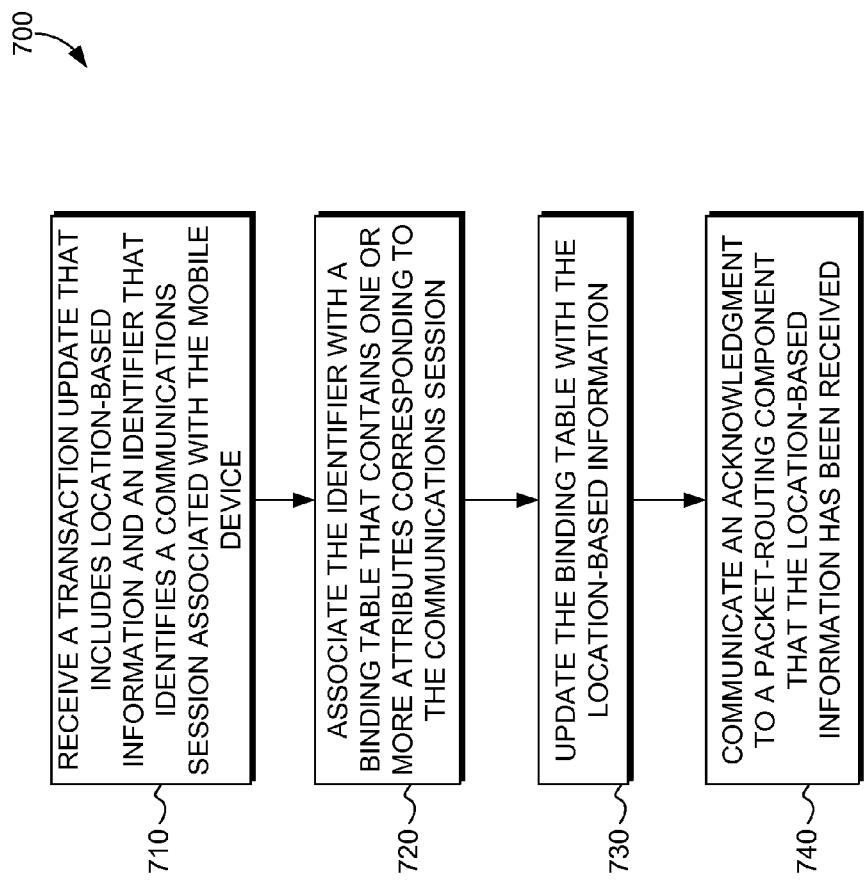
FIG. 7 is an exemplary flowchart depicting a method of dynamically updating a home agent with location-based information associated with a mobile device, according to an embodiment of the present invention.

FIG. 7 is an exemplary flowchart depicting a method 700 of dynamically updating a home agent with location-based information associated with a mobile device, according to an embodiment of the present invention. Initially, a transaction update is received by the home agent from a packet-routing component at step 710. The transaction update may include location-based information and an identifier that identifies a communications session associated with the mobile device. The location-based information may include, without limitation, a PCF, a BTS, a session identifier, or the like. Other information that provides an indication of the location of a mobile device may also be included in the location-based information and is contemplated to be within the scope of the present invention.

The identifier that is communicated to the home agent is associated with a binding table at step 720. The binding table contains one or more attributes corresponding to the communications session. These attributes may include, without limitation, a PCF, a BTS, a session identifier, a CoA, an NAI, an HoA, timers, or the like. Many other attributes may be included in the binding table and are all contemplated to be within the scope of the present invention. Some of the attributes are sent to the home agent via the transaction update and discussed above. Others are sent to the home agent via a MIP request, such as a binding update. The binding update is received from the packet-routing component, and may include, for example, a session identifier, a CoA, an NAI, an HoA, and one or more timers that indicate start and stop times of the communications session, which may be used by the home agent when the home agent is used for billing purposes. While the home agent may be used to obtain a billing feed, such as in the case of an IPv6 communications session, for example, the home agent typically does not contain certain key data fields in the binding table, such as the PCF and the BTS. Therefore, the location-based information can be sent to the home agent, as described herein, such as when the mobile device moves across an RAN, so that home-agent-based billing can be a viable alternative to PDSN-based billing.

Once the binding table has been located, it is updated at step 730 with the location-based information, thereby providing access to the third party of the location-based information that has been updated in the binding table such that the third party can determine the approximate location of the mobile device. For example, a third party may submit a request to the home agent to access the location-based information such that the location of the mobile device can be determined. An acknowledgment is communicated to the packet-routing component at step 740 indicating that the location-based information has been received.

In one embodiment, once the home agent has been sent the updated location-based information and this information has been populated in the binding table, the home agent may send the information, in the form of a record, to an AAA server, which may then send the information in the form of a user data record to the billing system. An agency, such as a law enforcement agency, may be able to access the location-based information through the home agent or the AAA server. The home agent provides the actual data, while the AAA provides records. The link of the agency to the home agent and AAA server is illustrated in FIG. 2.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-useable instructions embodied thereon that, when executed, cause a computing device to perform a method of dynamically updating a home agent with location-based information associated with a mobile device, thereby allowing a third party to determine a location of the mobile device, the method comprising:
   receiving from the mobile device a signaling message that includes the location-based information and a first identifier indicating that the location-based information has been updated for an existing communications session, wherein the location-based information is updated when the mobile device enters a different coverage area;
   referencing a database that associates the first identifier with a second identifier;
   communicating a transaction update to the home agent that includes the updated location-based information and the second identifier,
      (1) wherein, based on the second identifier, the home agent updates a binding table with the updated location-based information, and
      (2) wherein the binding table contains one or more attributes associated with the mobile device; and
   receiving a first acknowledgement from the home agent indicating that the binding table has been populated with the updated location-based information.

2. The media of claim 1, wherein the first identifier and the second identifier are the same.

3. The media of claim 1, wherein the first identifier is one or more of a session identifier or an international mobile subscriber identity (IMSI).

4. The media of claim 1, wherein the location-based information has been updated if the mobile device has moved into a different packet control function (PCF) coverage area.

5. The media of claim 1, wherein the location-based information has been updated if the mobile device has moved into a different radio access network (RAN) coverage area.

6. The media of claim 1, wherein the location-based information includes one or more of a packet control function (PCF), a base transceiver station (BTS), or a session identifier.

7. The media of claim 1, wherein the coverage area includes an area defined by one or more of a packet data serving node (PDSN), a base station controller (BSC), a packet control function (PCF), or a radio access network (RAN).

8. The media of claim 1, further comprising upon receiving the signaling message, communicating to the mobile device a second acknowledgment indicating that the signaling message has been received.

9. The media of claim 1, wherein the one or more attributes include one or more of a packet control function (PCF), a base transceiver station (BTS), a session identifier, a care-of-address (CoA), a network access identifier (NAI), a home address (HoA), or at least one timer.

10. Non-transitory computer-readable media having computer-useable instructions embodied thereon that, when executed, cause a computing device to perform a method of dynamically updating a home agent with location-based information associated with a mobile device, thereby allowing a third party to determine a location of the mobile device, the method comprising:

- receiving from a packet-routing component a transaction update that includes the location-based information and an identifier that identifies a communications session associated with the mobile device,
  - (1) wherein the location-based information is used to determine an approximate location of the mobile device, and
  - (2) wherein the location-based information includes one or more of a packet control function (PCF), a base transceiver station (BTS), or a session identifier;
- associating the identifier with a binding table that contains one or more attributes corresponding to the communications session;
- updating the binding table with the location-based information, thereby providing access to the third party of the location-based information that has been updated in the binding table such that the third party can determine the approximate location of the mobile device; and
- communicating an acknowledgment to the packet-routing component that the location-based information has been received.

11. The method of claim 10, further comprising receiving a request from the third party to access the location-based information.

12. The method of claim 10, further comprising receiving from the packet-routing component a binding update, wherein the binding update includes one or more of a session identifier, a care-of-address (CoA), a network access identifier (NAI), a home address (HoA), or at least one timer.

* * * * *